(12) United States Patent
Henrickson et al.

(10) Patent No.: US 7,587,694 B1
(45) Date of Patent: Sep. 8, 2009

(54) SYSTEM AND METHOD FOR UTILIZING META-CELLS

(75) Inventors: Lindor Eric Henrickson, San Jose, CA (US); Edwin Simon Petrus, Piedmont, CA (US)

(73) Assignee: CiraNova, Inc., Santa Clara, CA (US)

( * ) Notice: Subject to any disclaimer, the term of this patent is extended or adjusted under 35 U.S.C. 154(b) by 128 days.

(21) Appl. No.: 11/490,658

(22) Filed: Jul. 21, 2006

(51) Int. Cl.
G06F 17/50 (2006.01)

(52) U.S. Cl. .......................................... 716/10; 716/11

(58) Field of Classification Search ................. 716/8–11
See application file for complete search history.

(56) References Cited

U.S. PATENT DOCUMENTS

| | | | |
|---|---|---|---|
| 5,724,588 A | 3/1998 | Hill et al. | |
| 5,890,155 A | 3/1999 | Steinman et al. | |
| 5,920,486 A | 7/1999 | Beahm et al. | |
| 6,301,692 B1 * | 10/2001 | Kumashiro et al. | 716/10 |
| 6,490,708 B2 * | 12/2002 | Cohn et al. | 716/4 |
| 6,691,290 B1 * | 2/2004 | Wu | 716/4 |
| 7,117,469 B1 * | 10/2006 | Dahl | 716/11 |
| 7,136,268 B2 | 11/2006 | Stricker et al. | |
| 7,293,247 B1 | 11/2007 | Newton et al. | |
| 7,296,248 B2 | 11/2007 | Perez et al. | |
| 7,343,570 B2 * | 3/2008 | Bowers et al. | 716/2 |
| 7,343,581 B2 * | 3/2008 | Becker | 716/17 |
| 7,506,277 B1 | 3/2009 | Arora et al. | |
| 2003/0005400 A1 | 1/2003 | Karniewicz | |
| 2004/0268284 A1 | 12/2004 | Perez et al. | |
| 2006/0075371 A1 | 4/2006 | Kamat | |
| 2006/0080644 A1 | 4/2006 | Fuhrer et al. | |
| 2006/0118825 A1 | 6/2006 | Dokumaci et al. | |
| 2006/0143589 A1 | 6/2006 | Horng et al. | |
| 2007/0101306 A1 | 5/2007 | Bowers et al. | |
| 2007/0118825 A1 | 5/2007 | Gaul | |
| 2007/0266445 A1 | 11/2007 | Ferguson et al. | |
| 2007/0268731 A1 | 11/2007 | Weiland et al. | |

OTHER PUBLICATIONS

Balasa, F. & Maruvada, S.C., "Using Non-slicing Topological Representations for Analog Placement," IEICE Trans. Fundamentals, Nov. 2001, pp. 2785-2792, vol. E84-A No. 11.

(Continued)

*Primary Examiner*—Jack Chiang
*Assistant Examiner*—Binh C Tat
(74) *Attorney, Agent, or Firm*—Carr & Ferrell LLP (57) ABSTRACT

Exemplary systems and methods of laying out integrated circuits are disclosed. The systems include a layout application configured to place geometries in conformance with layout constraints transformed into composite cells. A composite cell defines a relationship between one or more cells, such as parameterized cells, and is independent of the physical topology of the cells. The exemplary systems are configured to use the composite cells to restrict a number of possible layout scenarios by generating a first layout scenario in conformance with the composite cell implementations, and to thereafter generate a second layout scenario in conformance with the constraints on all cells within the first layout scenario. Embodiments of the present invention are particularly suited to the layout of analog and mixed signal integrated circuits resulting in faster, more flexible, and more efficient layout as compared with conventional techniques which require the layout application to search through a much broader set of possible scenarios.

19 Claims, 5 Drawing Sheets

OTHER PUBLICATIONS

Bourguet, V., De Lamarre L., & Louërat, M.-M., "A Layout-Educated Analog Design Flow," Jul. 2004, pp. 485-488, vol. 1, Circuits Systems.

Nakatake, S., Fujuyoshi, K., Murata, H, & Kajitani, Y., "Module Packing Based on the BSG-Structure and IC Layout Applications," IEEE Transactions on Computer-Aided Design of Integrated Circuits and Systems, Jun. 1998, pp. 519-530, vol. 17, No. 6.

Tuong, P., Louërat, M.-M., Greiner, A., "Managing the Shape Function of Analog Devices in a Slicing Tree Floorplan," Jun. 2004, pp. 226-229, Proceedings of the 11th International Conference Mixed Design of Integrated Circuits and Systems (MIXDES 2004), Szczecin, Poland.

Yamanouchi, T., Tamakashi, K., & Kambe, T., "Hybrid Floorplanning Based on Partial Clustering and Module Restructuring," International Conference on Computer Aided Design Proceedings of the 1996 IEEE/ACM International Conference on Computer-Aided Design, California, 1996.

Blanchard, Terry, Assessment of the OpenAccess Standard: Insights on the new EDA Industry Standard from Hewlett-Packard, a Beta Partner and Contributing Developer. Proceedings of the Fourth International Symposium on Quality Electronic Design, 2003. 0-7695-1881-8/03.

Blanchard, Terry. Assessment of the OpenAccess Standard: Insights on the new EDA Industry Standard from Hewlett-Packard, a Beta Partner and Contributing Developer. Proceedings of the Fourth International Symposium on Quality Electronic Design, 2003. 0-7695-1881-8/03.

Candence Design Systems, Inc., "How to write a Pcell Evaluator Plug-in" 2006, 4 pages.

Candence Product Document on "Virtuoso® Parameterized Cell Reference", Aug. 2004, 274 pages.

Jingnan, Xu et al., "A SKILL™ -based Library for Retargetable Embedded Analog Cores", IEEE Proceedings of Design, Automation, and Test in Europe (DATE), 2001, 2 pages.

Mueller, Andreas, "Adapting C++ based Pcells on OpenAccess," Proceedings of CDNLive! Silicon Valley 2005, 6 pages.

Mueller, Andreas, "OpenAccess Adoption at Infineon Technologies AG," Infineon Technologies AG, Munich, Germany, Mar. 2005, 11 pages.

Xu, J.N., et al., "Reusability Methodology of IC Layout—Part II, A Fully Skill-based pCell Design and Layout Direct Retargeting Tool," IEEE Proceedings of Design, Automation, and Test in Europe (DATE), 2001, 6 pages.

* cited by examiner

SYSTEM AND METHOD FOR UTILIZING META-CELLS

BACKGROUND

1. Field of the Invention

The present invention relates generally to integrated circuit (IC) devices, and, more particularly, to IC device design.

2. Related Art

Traditionally, design of IC devices comprises a plurality of steps. Initially a schematic, or netlist, of elements of an IC device is generated. Subsequently, a layout scenario is determined based on the schematic. The layout scenario defines a physical representation of individual elements such as rectangles and polygons and their topology. Typically, identification of at least one satisfactory layout scenario in conformance with all constraints imposed is accomplished using complex and time consuming searches through numerous possible scenarios limited by a list of constraints impacting the physical cell level.

As complexity of integrated circuits increases and feature sizes shrink, capabilities of existing IC design systems can become a limiting factor in layouts of new integrated circuits. This is particularly true for design of analog and mixed signal IC devices, where layout is typically either performed manually or using automated layout tools. A typical automated layout tool searches through thousands, if not millions, of trial instantiations of the IC device at a basic primitive cell level in an attempt to perform a global optimization of the layout. Disadvantageously, the vast amount of searching requires significant computational resources. As complexity of IC devices to be designed and constraints imposed on their layouts evolve, it has become increasingly time consuming to identify a satisfactory and optimum layout scenario in conformance with all such constraints. Therefore, there is a need for improved systems and methods of designing integrated circuits.

SUMMARY

The present invention includes, in various embodiments, systems and methods for designing integrated circuits. In exemplary embodiments, the systems comprise a design engine configured to receive layout constraints from, for example, a layout application, and to transform the layout constraints into composite cells. The design engine is further configured to generate a first layout scenario in conformance with the constraints encompassed in the composite cells, thereby narrowing down the number of possible layout scenarios to be searched. Additionally, the design engine is configured to generate one or more second layout scenarios in conformance with primitive cell constraints within confines of remaining scenarios of the first layout scenario.

Some embodiments comprise composite cells at multiple hierarchical levels, allowing for narrowing down of possible layout scenarios to be searched in a recursive manner.

DETAILED DESCRIPTION OF EXEMPLARY EMBODIMENTS

Detailed descriptions of exemplary embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ embodiments of the present invention in virtually any appropriately detailed system, structure, or manner.

Figure 1:
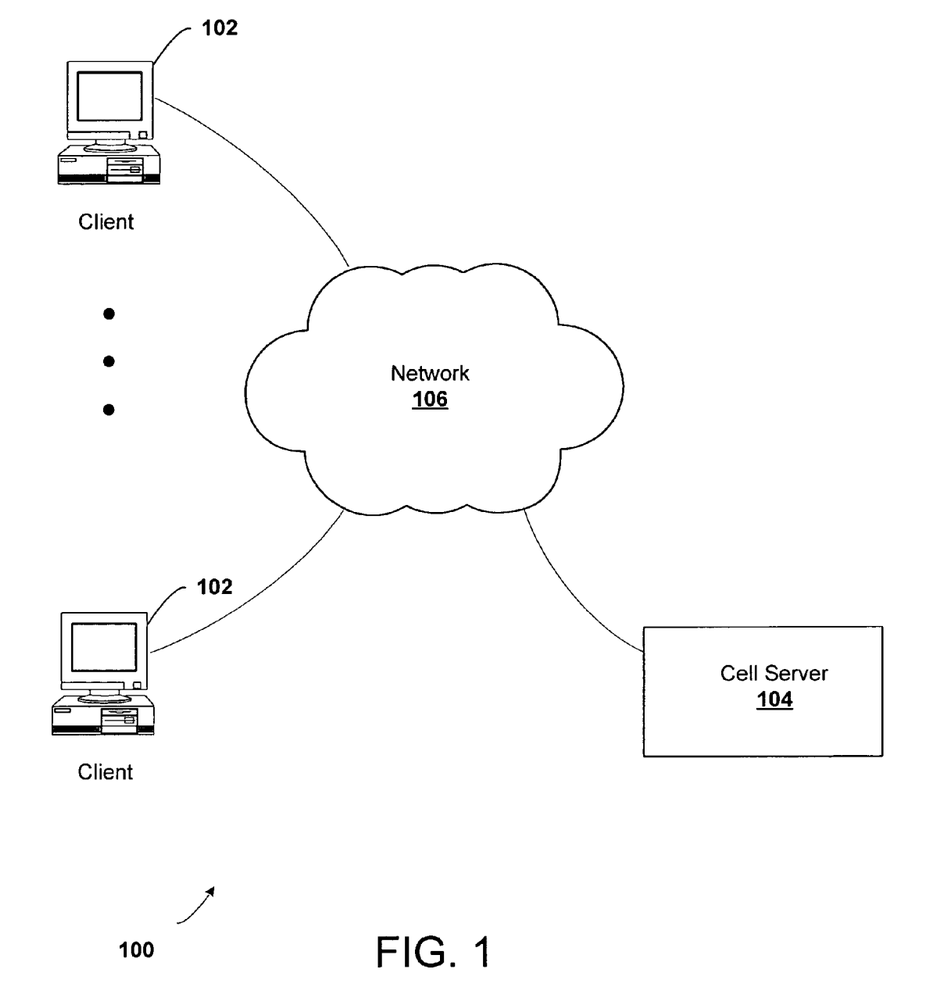
FIG. 1 is a diagram of an integrated circuit design system, according to various embodiments of the present invention.

FIG. 1 is an exemplary diagram of an environment 100 for providing an integrated IC design system. Exemplary embodiments of the present invention comprise one or more clients 102 configured to communicate with a cell server 104 over a network 106. The components illustrated in FIG. 1 may include software, hardware, firmware, or combinations thereof.

The client 102 comprises a computing device associated with a user. The client 102 may comprise a personal computer (e.g., a desktop or a laptop), a workstation, or other digital device. According to exemplary embodiments, the client 102 establishes constraints on an IC device under design, or a portion thereof. The client 102 then generates a physical representation of the IC design in a cell format. The client 102 makes the generated physical representation accessible to the user, for example, on a display coupled to the client 102. The physical representation is typically generated without user interaction (e.g., generated by a design engine component of the client 102 transparent to the user). The client 102 is discussed in greater detail in connection with FIG. 2 and FIG. 3. The concept of cells is also discussed in greater detail below.

The cell server 104 may comprise a repository for storing physical representations in cell format. In exemplary embodiments, the cell server 104 may comprise cells in an open standard database compatible format. In some embodiments, the cell server 104 may comprise a computational engine for generating new cells in response to a request for cells which do not already exist in the repository. The cell server 104 is discussed in greater detail in connection with FIG. 4 below.

The network 106 may comprise any inter-process communications (IPC) setup, for example across a network or on the same device as the client 102. The network 106 may comprise any network, such as Internet, local area network (LAN), wide area network (WAN), or any other type of communication network. In an environment 100 comprising two clients 102, for example, the network 106 may be an IPC setup between the two clients 102.

Figure 2:
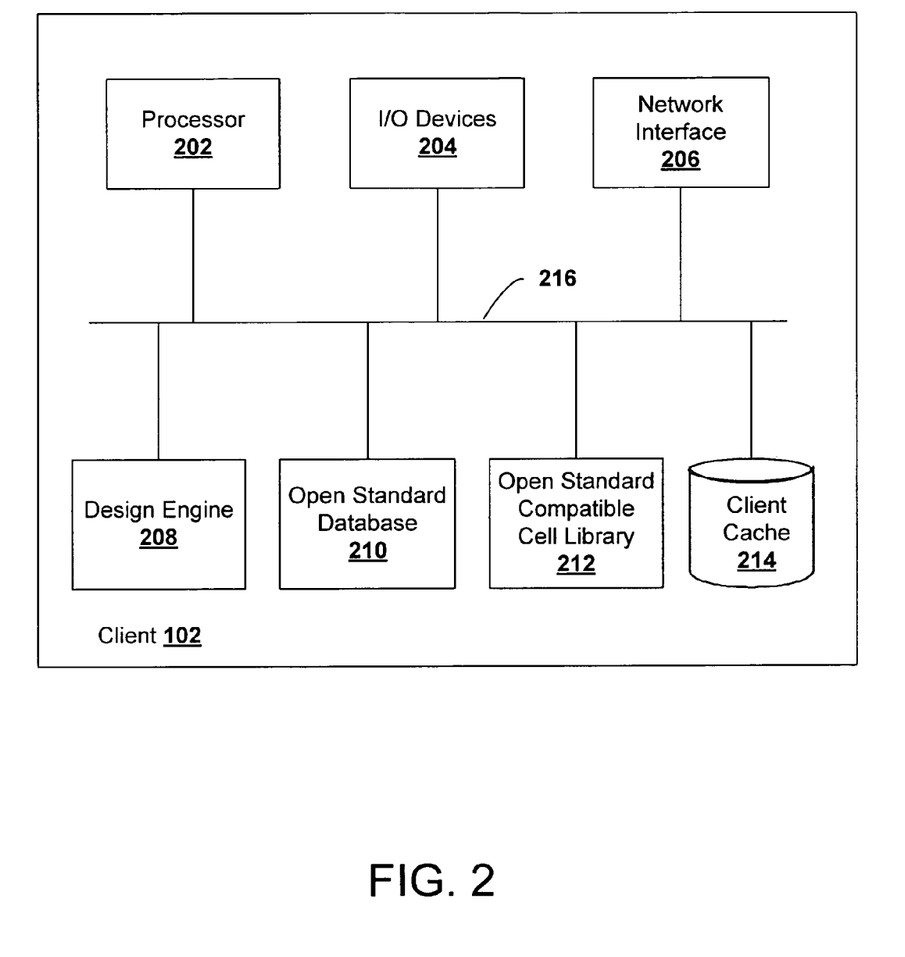
FIG. 2 is an exemplary block diagram of a client.

FIG. 2 is an exemplary block diagram of the client 102. The exemplary client 102 comprises a processor 202, I/O devices 204, a network interface 206, a design engine 208, an open standard database 210, an open standard compatible cell library 212, and a client cache 214. The various components of the client 102 may be coupled via an internal bus 216. The use of the internal bus 216 allows each of the components to transfer data among themselves. The processor 202 may be a Sparc™, a PowerPC™, an X86™, a RISC™, or the like. The I/O devices 204 may comprise a monitor, a relative pointing device (e.g., a mouse), a keyboard, a CDROM drive, or the like.

The network interface 206 is a point of interconnection between the client 102 and the network 106 (e.g., a network card on the computing device of client 102). In some embodiments, the network interface 206 may interconnect two clients 102. In other embodiments, the network interface 206 is optional. For example, in an embodiment including a stand-alone client 102, the network interface 206 is not required, because the client 102 is not coupled to the network 106.

The design engine 208 is configured to receive constraints and requests to generate layout scenarios conforming with constraints imposed on a physical layout. The design engine 208 may also identify at least one conforming physical layout. As used herein, the term "constraint" refers to limitations, directives, design and composition styles, capabilities, and the like. A limitation may relate to topology (e.g., how elements of the IC design are to be arranged in relation to each other) and may comprise, for example, limitations on size (e.g., height, width or aspect ratio), shape, pattern, or structure of at least one primitive cell, or a requirement that certain elements be clustered. The limitation may also be an electrical constraint, for example, related to electrical performance (e.g., to maintain a distance between a noisy part and a quiet part of the IC design). A directive may comprise, for example, a relative placement or proximity of elements, ordered groupings of elements, symmetrical placements of elements (e.g., symmetry along a central vertical axis), and pin and power supply placements on the physical layout. Design and composition styles may comprise, for example, custom digital cells, analog and/or mixed signal cells, digital standard cells, and the like. A capability may comprise, for example, whether an element may be rotated, flipped, routed over, or routed around. The design engine 208 is described in more detail in connection with FIG. 3.

The open standard database 210 is configured to store IC design resources compatible with an open standard data format. The term "open standard" as used herein may comprise the OpenAccess standard as promoted by Silicon Integration Initiative, Inc. The term "open standard database" as used herein may comprise the OpenAccess database implementation or another database implementation compatible with the OpenAccess application programming interface. Open standard and open standard database may further include any other open standard intended to facilitate interoperability among IC design tools.

A "cell" comprises an element of an IC design for which a physical representation (also known as an instance) is sought. The term "primitive cell" as used herein comprises a cell at a basic hierarchical level, such as a single, primary, stand-alone element. An example of a primitive cell is a parameterized cell (PCell). The term "collection of cells" as used herein comprises a collection, or arrangement, of primitive cells (e.g., PCells). A parameter is a setting that controls the size, shape, or contents of a cell. A PCell is an instance of a cell generated in conformance with the parameter values given. The term "composite cell" as used herein comprises a cell at a level of abstraction above a physical representation inherent in the primitive cell. An example of a composite cell is a meta-cell. The composite cells are discussed in further detail herein.

The open standard compatible cell library 212 is configured to store design data compatible with an open standard format. The open standard compatible cell library 212 may comprise data related to primitive cells, composite cells, or a combination thereof (collectively, cell resources). The open standard compatible cell library 212 may optionally comprise two or more separate libraries (e.g., one for primitive cells and one or more for meta-cells, such as one library for each meta-cell hierarchical level).

The client cache 214 comprises a repository for data (e.g., IC design data). The client cache 214 may store design data such as the data contained in the open standard compatible cell library 212. In exemplary embodiments of the present invention, the contents of the client cache 214 are saved to disk (e.g., at the completion of a user's layout tasks for that working day). When the layout is opened again, the design data need not be recomputed by the design engine 208 but can instead be loaded from the client cache 214. The efficiency improvement in reloading design data from the client cache 214 increases with a number of instances that would otherwise need to be recomputed in order to recreate physical representations of the design data. In some embodiments, the time to open an IC design previously saved to disk may decrease from around twenty minutes, where the entire layout needs to be recomputed, to about three minutes where design data have been stored to the client cache 214.

In some embodiments, the client cache 214 comprises a temporary repository. It should be noted that the cache 214 is not essential to utilization of meta-cells. As such, in some embodiments, the client cache 214 is optional. The use of the open standard database 210, the open standard compatible file library 212, and, optionally, the client cache 214 during the layout process is described in further detail below.

For purposes of illustration, the design of IC devices using cell libraries compatible with the OpenAccess format is discussed herein. However, the scope of the present invention and the examples provided are intended to extend to other types of non-proprietary formats and standards. Further, the scope of the present invention is intended to apply to the design of analog and mixed signal ICs as well as digital ICs. Examples referring to one of these formats, standards, and/or types of IC devices are intended to be applicable to others.

As previously discussed, the composite cell is an abstraction at a hierarchical level above primitive cells. Primitive cells, once instantiated during the layout process, acquire frozen physical and electrical topology. The composite cell, on the other hand, defines a relationship. The relationship may comprise, for example, the relationship between two or more primitive cells, a transformation of one or more primitive cells, or the like, independent of the physical topology of the primitive cells. The composite cell can also perform a one-to-many mapping, for example, by generating multiple primitive cells to form a collection of primitive cells optimized to perform a particular function. The composite cells, therefore, operate at a level between a primitive cell level and a level of the IC design user application, and are independent of the underlying technology (e.g., nMOS).

Composite cells may impose constraints as previously defined. For example, a composite cell may define a physical relationship between two primitive cells such as placement of a first primitive cell adjacent to or in a symmetrical relationship with a second primitive cell. In some embodiments, the composite cell may operate on a single primitive cell. For example, the composite cell may comprise a directive to rotate a primitive cell a particular angle. The composite cell may further describe one or more styles to be used. In addition, composite cells may house a collection of primitive cells and/or other composite cells and treat them as a unified composite entity. Operations and transformations may then be applied to the composite entity.

The composite cell may also comprise user-defined program code, for example, code defining a constraint on physical qualities (e.g., size or shape), transformations, or the like, as previously discussed. The user-defined program code may, but need not, include parameter values. The program code need not refer to any cell as such. For example, the composite cell may cause a specialized engine (e.g., a different user application) to generate cells or collections of cells on demand, or to transform or constrain cells or collections of cells.

The inclusion of composite cells in the IC design system creates a hierarchy of operations and constraints imposed on the primitive cells through which a layout scenario may ultimately be generated. The composite cells are implemented in a user application and platform neutral manner such that any user application and primitive cell may communicate freely through the layers of the composite cells. Some embodiments include composite cells at multiple hierarchical levels above the primitive cell level.

In the following discussion, composite cells compatible with the OpenAccess format are referred to as meta-cells. However, the use of the composite cells is equally applicable to other formats. Furthermore, although the composite cells as discussed herein are intended to be included in non-proprietary systems as part of improving interoperability, the composite cells may be applied to proprietary systems and standards to improve computational efficiency of a single electronic design automation (EDA) vendor's tool chain.

Figure 3:
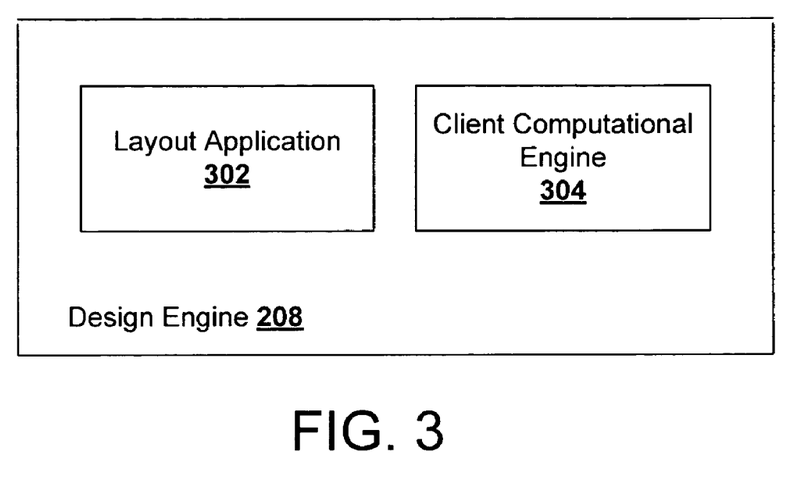
FIG. 3 is an exemplary block diagram of a design engine.

Referring now to FIG. 3, a block diagram of the exemplary design engine 208 is shown. In exemplary embodiments, the design engine 208 comprises a layout application 302 and a client computational engine 304. The exemplary layout application 302 is an application configured to define a physical implementation of an IC, including a specification of constraints to be imposed on a layout to be generated. The layout application 302 may comprise functionality (e.g., creating and editing polygons, paths, rectangles, and contacts of the layout), scripting of cell definitions, or the like.

The client computational engine 304 is configured to receive layout constraints (e.g., from the layout application 302, user-defined scripts, or cells) and to compile the constraints into meta-cell implementations. To compile, in this context, means to translate a human input (e.g., constraints, schematics, and the like), into a form that the client computational engine 304 can understand. As such, the form with which the design engine 208 works, involves a description in terms of meta-cells. For example, in one embodiment, the human input comprises the user's using the pointing device to click on two transistors on the schematic displayed by the layout application 302. The human input further comprises indicating that the two transistors be placed next to each other in the IC design. The client computational engine 304 then translates the human input into a meta-cell, In one embodiment, the constraints are schematic driven. For example, the constraints are established via annotations to the schematic or via data contained in a text file or a spreadsheet input to the layout application 302.

The client computational engine 304 is configured to communicate with the open standard database 210 for the purpose of generating such transformations compatible with an open standard format, according to exemplary embodiments. The client computational engine 304 is further configured to communicate meta-cell implementations to the open standard compatible library 212 for storage. Furthermore, the client computational engine 304 may perform its operations in a manner transparent to the user of the IC design system.

In exemplary embodiments, the client computational engine 304 requests meta-cell and primitive cell data from the open standard compatible cell library 212. The client computational engine 304 may further be configured to determine whether a constraint received already exists in the open standard compatible cell library 212. If so, the client computational engine 304 may retrieve the cell from the open standard compatible cell library 212 in lieu of transforming the constraint to a meta-cell implementation.

In some embodiments, a user may write a meta-cell implementation. For example, the user may write a meta-cell to create a new cell to achieve a purpose specific to the user's IC design, or to create a specific layout constraint. In this manner, the user is able to naturally extend the capabilities of the IC design tools provided by the EDA vendor. In other embodiments, a user may edit an existing meta-cell implementation. An example of a scripting language for writing and editing meta-cell implementations is Python promoted by the Python Software Foundation.

Figure 4:
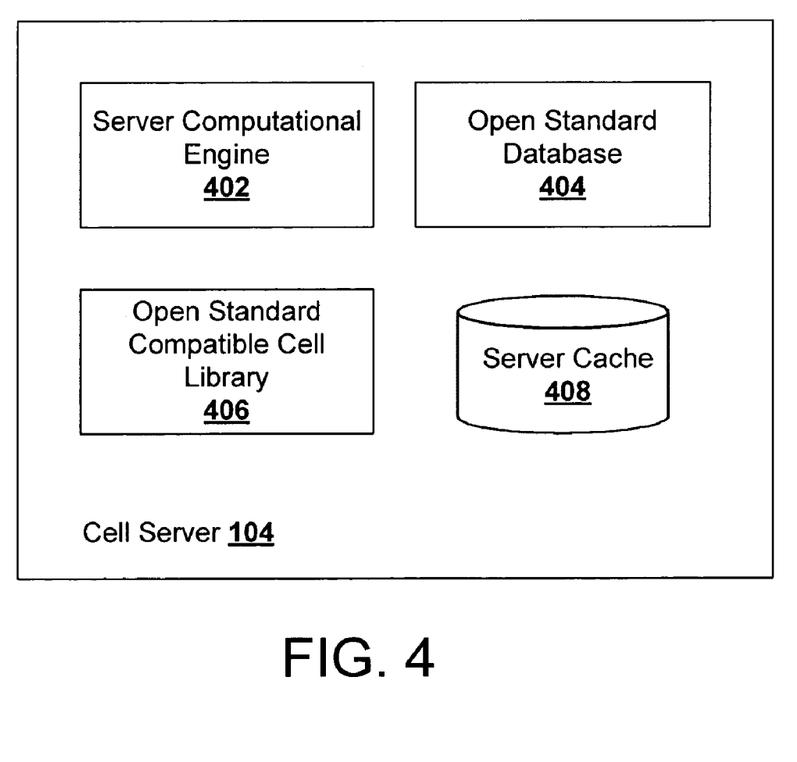
FIG. 4 is an exemplary block diagram of a cell server.

In some embodiments of the present invention, one or more of the clients 102 are coupled to the cell server 104 via the network 106. In these embodiments, the cell server 104 may comprise a server computational engine 402, an open standard database 404, an open standard compatible cell library 406, and a server cache 408, as illustrated in FIG. 4. Alternative embodiments may comprise fewer components. The server computational engine 402 is configured to perform an equivalent function of the client computational engine 304 for the one or more clients 102. Similarly, the open standard database 404 is configured to perform the same function as the open standard database 210 for one or more clients 102 connected to the cell server 104 via the network 106.

In embodiments comprising multiple clients 102, some efficiency improvements may be achieved by having, for example, an open standard database 404 on the cell server 104 rather than duplicating databases by having one open standard database 210 on each client 102. Efficiencies may comprise, for example, a reduction in storage capacity required on the clients 102, a reduction in maintenance and backup required on the clients 102, and the like. Likewise, some efficiencies may be achieved by performing computations in the server computational engine 402 and/or by storing the resulting design data to the open standard compatible cell library 406 and the server cache 408 rather than duplicating such calculations on multiple clients 102. For example, some elements of an IC design are likely to recur more often. Computing the physical representation for such elements once, on the cell server 104, rather than multiple times on each of the clients 102, results in computational efficiency. Similarly, storing often recurring design data in the open standard compatible cell library 406 and the server cache 408 accessible to multiple clients 102 will result in some efficiencies.

In alternative embodiments, some or all of the components of the cell server 104 may be duplicated on the clients 102. For example, a particular client 102 may be dedicated to the design of integrated circuits involving highly sensitive business or military information not intended to, or suitable for, being made standard to users of other clients 102 as part of the cell server 104.

The open standard compatible cell library 406 is configured to store cell resources for one or more IC designs under layout on the clients 102. In some embodiments, the open standard compatible cell library 406 is configured to operate in lieu of the open standard compatible cell library 212 on the clients 102. In other embodiments, the open standard compatible cell library 406 on the cell server 104 is configured to operate in addition to the open standard compatible cell libraries 212 on the clients 102. In these embodiments, cell resources may reside in the open standard compatible cell library on the cell server 104 as well as in the open standard compatible cell libraries 212 on the clients 102.

The server cache 408, like the client cache 214, is configured to store data (e.g., the data in the open standard compatible cell library 406) for faster access. In some embodiments, the server cache 408 is optional.

Figure 5:
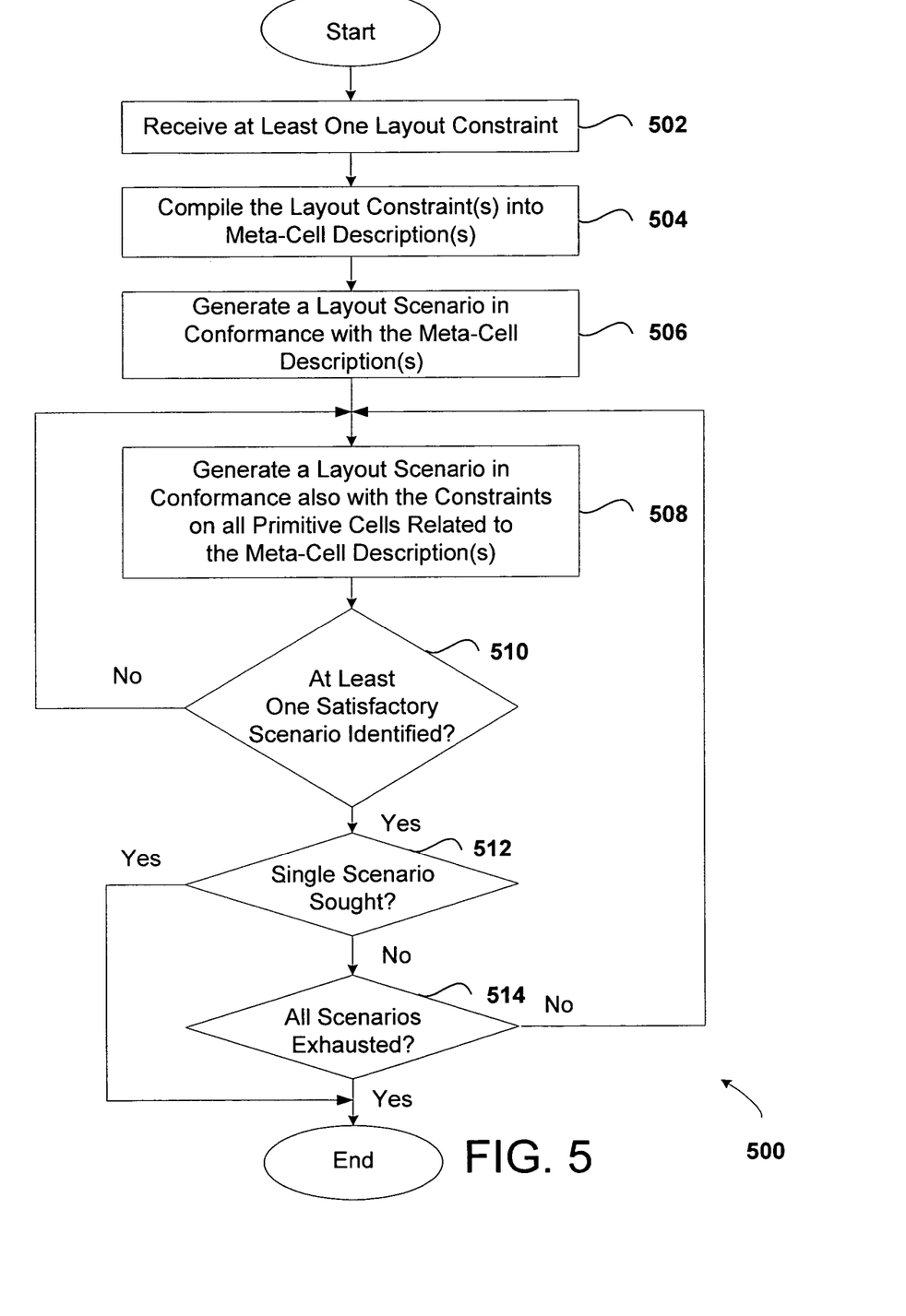
FIG. 5 is a flowchart of a method for generating a layout scenario in conformance with layout constraints, according to various embodiments of the present invention.

FIG. 5 illustrates a flowchart of an exemplary method for generating a layout scenario in conformance with layout constraints. According to exemplary embodiments, the client computational engine 304 receives at least one layout constraint from the layout application 302 in step 502. In an alternative embodiment, the constraints are received from the open standard compatible cell library 212 in the form of at least one meta-cell.

In step 504, the one or more received layout constraints are compiled by the client computational engine 304 into meta-cell format if the layout constraints are not already received or available in such a meta-cell format. Methods for determining whether meta-cells are already available are further described in connection with FIG. 6. In some embodiments, the newly generated meta-cells may be stored in the open standard compatible cell library 212.

In step 506, the client computational engine 304 narrows down possible layout scenarios by generating a first layout scenario in conformance with the meta-cell implementations from steps 502 and 504. The computational engine 304 treats the constraints encompassed in the meta-cells as known restrictions around which a remainder of the layout is to be generated. For example, the computational engine 304 receives a request from the layout application 302 for a certain type of cell and parametric values. In return, the computational engine 304 queries a bounding box, number of pins, and pin locations of a meta-cell. Unlike a traditional layout tool, which requires computation of a primitive polygonal representation of each primitive cell involved, the meta-cell in embodiments of the present invention may be able to compute the bounding box without actually instantiating the primitive cells, themselves. Through the use of meta-cells, the computational engine 304 is able to restrict the possible layout scenarios to primitive cells not related to, or affected by, limitations compiled into the meta-cells. This results in a limited number of possible layout scenarios remaining to be evaluated in step 508, and results in a huge computational savings.

In step 508, the client computational engine 304 generates a layout scenario in conformance with the constraints on all primitive cells within the remaining possible layout scenarios. Each layout scenario generated in step 508 is therefore automatically subject to the meta-cell constraints. The layout scenarios in conformance with the constraints on all primitive cells encompassed by the IC under layout, but not in conformance with the constraints encompassed in the meta-cell implementations, are never generated in step 508, thereby reducing the number of layout scenarios to be searched. As a result, the time and computational resources required to identify one or more scenarios in conformance with all layout constraints imposed on the IC design are significantly reduced. The increased efficiency is particularly noticeable in comparison with existing manual layout techniques.

In some embodiments including meta-cells at multiple hierarchical levels step 506 is performed once per meta-cell level to gradually reduce the number of possible scenarios to be searched in step 508.

In some embodiments, the identification of a single satisfactory layout scenario in step 508 suffices. In these embodiments, the client computational engine 304 concludes the generation of possible layout scenarios, in step 512, as soon as the single satisfactory layout scenario has been identified in step 510. In other embodiments, the process continues until all scenarios are exhausted in step 514. In these embodiments, the computational engine 304 returns to step 508 to identify further layout scenarios in conformance until all possible scenarios identified in step 506 have been exhausted.

In yet other embodiments, more than one scenario may be of interest, however, the number of satisfactory scenarios sought may be limited to a maximum number. In these embodiments, step 512 may be modified such that the process repeats until the maximum number of scenarios of interest has been reached or until all possible scenarios have been exhausted, whichever occurs first.

In yet other embodiments, more than one satisfactory scenario is sought for comparative analysis among the scenarios identified. The user may seek to compare scenarios comprising, for example, variable shape cells (e.g., cells with a variable aspect ratio, or a variable size).

To illustrate the computational efficiency of embodiments of the present invention, in one example, the generation of a single layout takes on the order of two minutes. In order to accomplish the same results through manual layout would take between approximately half a day and one day. To further compare, the use of a current automated layout tool would require not less than half a day.

It should be noted that the flowchart of FIG. 5 is exemplary. Alternative embodiments may comprise more, fewer, or functionally equivalent steps. For example, in some embodiments, the layout constraints received in step 502 may be so few and/or simplistic that compiling the constraints into meta-cells, in step 504, and generating a layout in conformance with the meta-cells in step 506 may be superfluous, rendering steps 504 and 506 optional. In other embodiments, step 508 is optional or performed in a different manner. For example, in some embodiments, meta-cells are utilized in a generic manner (e.g., not involving primitive cells or PCells). For example, utilizing meta-cells in the generic manner may comprise imposing constraints on the IC design without imposing constraints on primitive cells. For purposes of illustration, the meta-cells may comprise using a look-up table.

Figure 6:
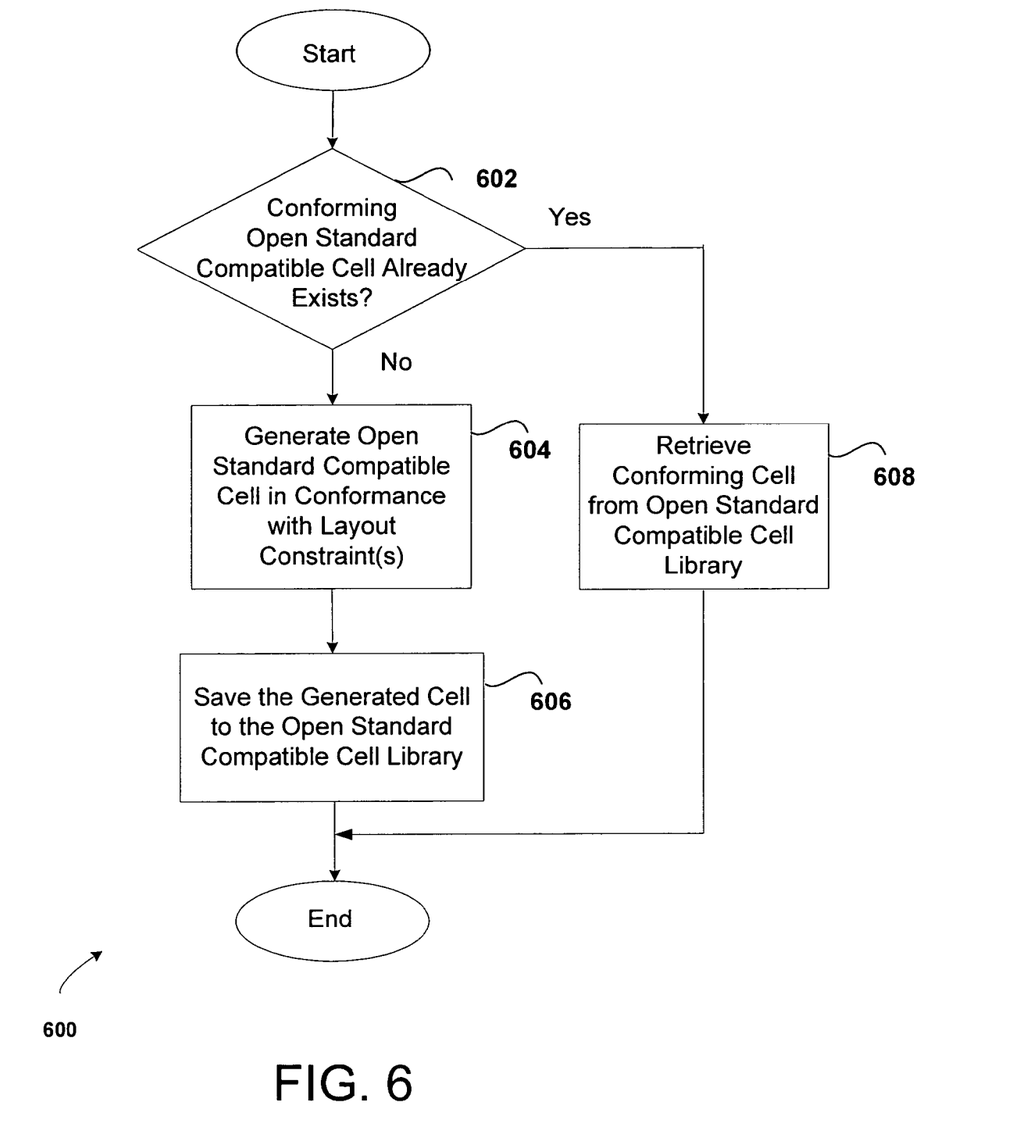
FIG. 6 is a flowchart of a method for determining whether an open standard compatible cell is available in existing open standard compatible file resources, according to various embodiments of the present invention.

Referring now to FIG. 6, a flowchart of a method for determining whether meta-cells are already available such that a constraint need not be compiled in step 504 is shown. In exemplary embodiments, a meta-cell is already available if it exists in the open standard compatible cell library 212. In a step 602, the computational engine 304 queries the open standard compatible cell library 212 to determine whether an open standard compatible cell resource corresponding to the layout constraint received in step 502 is stored in the open standard compatible cell library 212. If a compatible cell already exists, the computational engine 304 may retrieve the conforming cell from the open standard compatible cell library 212 rather than recompile it.

If, however, a compatible cell does not exist, the computational engine 304 generates the desired cell in step 604. In exemplary embodiments, the computational engine 304 uses the open standard database 210 to transform the received layout constraint and generates an open standard compatible cell in conformance with the received layout constraint. Typically, the open standard compatible cell generated in step 604 will be a meta-cell. However, the layout constraint received in step 502 may be a constraint on an individual primitive cell, in which case the open standard compatible cell generated in step 604 will be an open standard compatible primitive cell.

In some embodiments, the meta-cell is transformed into a collection of primitive cells (e.g., PCells). In such embodiments, the transformation is typically performed for the final layout. The transformation may be necessary where the final layout is to be delivered to a third party, whose EDA tools are incapable of interpreting meta-cells.

In step 606, the open standard compatible cell may be saved to the open standard compatible file library 212 for future reference. In alternative embodiments, step 606 is optional.

As discussed earlier, for reasons related to computational efficiency, computer storage and/or processing constraints, confidentiality or sensitivity of information, and the like, some components of the cell server 104 may be used in lieu of, or in addition to, equivalent components on one or more clients 102. In some embodiments, the server computational engine 402 is used in lieu of the client computational engine 304 in the methods illustrated in FIGS. 5 and 6 and described herein. In yet other embodiments, the server computational engine 402 and the client computational engine 304 may share the tasks in performing the steps illustrated in FIGS. 5 and 6. Furthermore, in some embodiments, open standard compatible cells may be stored in the open standard compatible cell library 406 on the cell server 104 in lieu of, or in addition to, in the open standard compatible cell library 212 on the client 102. In still other embodiments, open standard compatible cells may be stored on the cell server 104 as well as on one or more clients 102.

In yet other embodiments, open standard compatible cells may be stored partially on the cell server 104 and partially on one or more clients 102. For example, assuming two clients 102, the open standard compatible cells of use to the design engine 208 on both of the clients 102 may be stored in the open standard compatible cell library 406 on the cell server 104, whereas the open standard compatible cells of use only to one client 102 may be stored only in the open standard compatible cell library 212 for that one client 102.

Likewise, in some embodiments, one or more clients may not have a local open standard database 210 and may therefore refer to the open standard database 404 on the cell server 104 as needed.

In an IC design system involving the cell server 104, the cell generated in step 604 may be saved to the open standard compatible file library 212 on the client 102, to the open standard compatible file library 406 on the cell server 104, or both. Saving the cell on the cell server 104 is likely to achieve greater increased efficiency in future layout steps of the current IC and/or future designs, because the newly generated cell is thereby made available to all clients 102.

In some embodiments, the resources in the open standard compatible cell library 212 may be stored in the client cache 214. Use of the server cache 408 may, in some embodiments, result in higher efficiencies, for example, in terms of storage space as compared to using multiple client caches 214. On the other hand, storing design data to the client cache 214 may result in faster performance, as experienced by the user during the layout process, for example, as compared to storing design data to the, possibly remote, server cache 408. In alternative embodiments, the resources in the open standard compatible cell library 212 may be partially or fully stored in the server cache 408. In yet other embodiments, the clients 102 are prevented from accessing the server cache 408 directly. In these embodiments, the server cache 408 is accessible only via the server computational engine 402. Alternative embodiments may comprise no client cache 214 and/or no server cache 408.

In some embodiments of the present invention, the client 102, cell server 104, and the network 106 components reside on the same computing device. For example, some embodiments comprise a single personal computer comprising all components of the IC design environment 100.

It should be noted that FIG. 6 also illustrates methods for generating cells (e.g., primitive cells, composite cells, collections of cells, digital standard cells, and so forth) on demand. Step 604 and step 606 may define a meta-cell implementation, such that the meta-cell may be used to generate cells. In other embodiments, the meta-cell implementation may be defined to generate multiple primitive cells, optionally forming a collection of primitive cells optimized to perform a particular function. For example, a digital standard cell may be generated with variations on cell timing, size, process technology, and the like. Through step 606, the open standard compatible cell library 212 becomes a cache for the cells generated in step 604 and/or by the meta-cell. A size of the open standard compatible library 212 grows adaptively until it reaches a size of primitive cells optimal for a given technology.

The inclusion of meta-cells in the IC design system creates a structure wherein constraints on a layout may be imposed at several hierarchical levels. It should be appreciated that the efficiency achieved will vary with the level of complexity introduced through the hierarchical use of meta-cells. For example, the efficiency may depend on the number of meta-cells, the complexity of meta-cells, and the number of hierarchical levels included in the system. At one extreme, the inclusion of large numbers of meta-cells results in a single top or root meta-cell. At this extreme, the physical layout structure has, in effect, been specified in its entirety by the meta-cell hierarchy. The layout process becomes a hierarchical series of meta-cell operations, where the cell at the highest level becomes the top meta-cell. The layout application 302 has but one task to perform, namely to process the top meta-cell. For some IC designs, this result is desirable, whereas for others, the result is disadvantageous. At the other extreme, including few meta-cells results in a situation similar to existing automatic layout tools, which require extensive searching through large numbers of possible layout scenarios. To the extent an optimum level of meta-cells (in number as well as in hierarchical levels) exists, the level varies depending on the user and the IC design specifics. However, varying degrees of flexibility and efficiency are achievable between the two extremes.

The present invention has been described above with reference to exemplary embodiments. It will be apparent to those skilled in the art that various modifications may be made and that other embodiments can be used without departing from the broader scope of the present invention. For example, while the OpenAccess format is discussed herein, one of ordinary skill in the art would understand that systems and methods of using composite cells may be accomplished in an equivalent approach with reference to other formats as well, including proprietary IC design systems and formats. Therefore, these and other variations upon the exemplary embodiments are intended to be covered by the present invention.

What is claimed is:

1. A system for designing an integrated circuit, comprising:
a design engine stored in memory and executable by a processor to:
utilize a cell file library configured to store cell resources comprising composite cell resources;
receive at least one layout constraint;
compile the at least one layout constraint into at least one composite cell implementation;

generate a first layout scenario of one or more geometries in conformance with the at least one composite cell implementation;

generate a second layout scenario in conformance with the first layout scenario, wherein the generation of the second layout scenario comprises generating an open standard compatible cell in conformance with the at least on composite cell implementation and saving the generated open standard compatible cell to a cell file library when a cell in conformance with the first layout scenario does not exist; and repeat the generation of the second layout scenario until all possible layout scenarios have been exhausted.

2. The system of claim 1 wherein the cell resources further comprise primitive cell resources.

3. The system of claim 1 wherein the cell file library is an open standard compatible file library.

4. The system of claim 1 wherein the composite cell resources comprise meta-cells.

5. The system of claim 1 wherein the cell resources comprise parameterized cells.

6. The system of claim 1 further comprising a network interface configured to communicate with a cell server.

7. The system of claim 1 further comprising a cell server, the cell server comprising the cell file library.

8. A method for designing an integrated circuit, comprising:

receiving at least one layout constraint;

compiling the at least one layout constraint into at least one composite cell implementation, the compiling performed by a processor;

generating a first layout scenario of one or more geometries in conformance with the at least one composite cell implementation;

generating a second layout scenario in conformance with the first layout scenario, wherein the generation of the second layout scenario comprises generating an open standard compatible cell in conformance with the at least on composite cell implementation and saving the generated open standard compatible cell to a cell file library when a cell in conformance with the first layout scenario does not exist; and repeating the generating of the second layout scenario until all possible layout scenarios have been exhausted.

9. The method of claim 8 further comprising accessing a cell file library.

10. The method of claim 8, wherein the generating of the second layout scenario comprises retrieving from a cell file library a cell in conformance with at least one composite cell implementation, if one exists.

11. The method of claim 8, wherein the generating the open standard compatible cell is performed by a composite cell.

12. The method of claim 8 further comprising repeating the generating of the second layout scenario until at least one satisfactory layout scenario has been identified.

13. The method of claim 8 wherein the at least one layout constraint applies to a single cell.

14. The method of claim 8 wherein the at least one layout constraint comprises at least one topological constraint.

15. The method of claim 8 wherein the at least one layout constraint comprises at least one electrical constraint.

16. The method of claim 8 wherein the at least one layout constraint comprises a constraint on the relative coordinates of multiple cells.

17. The method of claim 8 wherein the at least one layout constraint comprises at least one directive.

18. The method of claim 8 wherein the at least one layout constraint comprises at least one design and composition style.

19. A machine readable medium having embodied thereon a program, the program being executable by a machine to perform a method for designing an integrated circuit, the method comprising:

receiving at least one layout constraint;

compiling the at least one layout constraint into at least one composite cell implementation;

generating a first layout scenario of one or more geometries in conformance with the at least one composite cell implementation;

generating a second layout scenario in conformance with the first layout scenario, wherein the generation of the second layout scenario comprises generating an open standard compatible cell in conformance with the at least on composite cell implementation and saving the generated open standard compatible cell to a cell file library when a cell in conformance with the first layout scenario does not exist; and repeating the generating of the second layout scenario until all possible layout scenarios have been exhausted.

* * * * *

UNITED STATES PATENT AND TRADEMARK OFFICE
CERTIFICATE OF CORRECTION

PATENT NO. : 7,587,694 B1  Page 1 of 1
APPLICATION NO. : 11/490658
DATED : September 8, 2009
INVENTOR(S) : Henrickson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this

Twenty-first Day of September, 2010

David J. Kappos
*Director of the United States Patent and Trademark Office*